PHOTOSENSITIVE TWO STATE CIRCUITS AND SYSTEMS

Filed June 29, 1961 3 Sheets-Sheet 1

INVENTOR
RENÉ H. TERLET

BY Curtis Ailes Jr.
ATTORNEY

May 25, 1965 R. H. TERLET 3,185,850

PHOTOSENSITIVE TWO STATE CIRCUITS AND SYSTEMS

Filed June 29, 1961 3 Sheets-Sheet 2

United States Patent Office 3,185,850
Patented May 25, 1965

3,185,850

PHOTOSENSITIVE TWO STATE CIRCUITS AND SYSTEMS

René H. Terlet, Ossining, N.Y., assignor to International Business Machines Corporation, New York, N.Y., a corporation of New York Filed June 29, 1961, Ser. No. 120,702
10 Claims. (Cl. 250—209)

This invention relates to circuits which are capable of achieving two different states and systems composed of such circuits, and more particularly to such switching circuits and systems which may be embodied with photologic circuitry.

In logical circuitry such as is used in telephony, or in data processing or computing equipment, one of the major needs is for economical circuits for the production of precisely shaped pulses which may be required in response to input signals which are in the form of pulses of short or prolonged duration.

Accordingly, it is one object of the present invention to provide circuitry which is economical and which is capable of producing precisely timed pulses of constant amplitude.

Another object of the present invention is to provide a circuit which is capable of operating as a pulse shaper or pulse amplifier to provide an output pulse of constant amplitude and predetermined duration in response to an input pulse.

Another object of the present invention is to provide a single shot circuit which is capable of delivering only one output pulse of predetermined duration in response to any input pulse, and in which the input pulses may be of random duration.

Another object of the invention is to provide a circuit which is capable of producing constant amplitude output pulses having a duration which is completely independent of the duration of the input pulse.

Another object of the invention is to provide a circuit which is capable of producing an output pulse having a duration which is equal to the duration of the input pulse minus a fixed time period.

Another object of the invention is to provide a repetitive pulse generator which is capable of delivering a succession of pulses and in which the "pulse on" and the "pulse off" periods are of predetermined duration.

Another object of the present invention is to provide a circuit which is capable of operation as a square wave generator having a symmetrical output in which the up and down portions of the output wave are equal in duration.

Other objects and advantages of the invention will be apparent from the following description and the accompanying drawings.

In carrying out the objects of the invention in one embodiment thereof there is provided a two state circuit including a first voltage responsive light source and a capacitor connected and arranged to be energized through a resistive circuit path when said light source is energized. A second voltage responsive light source is connected in parallel with the capacitor and operable for illumination when the capacitor is charged to a sufficient voltage level. A photoresponsive device is arranged to receive illumination from the second light source and is connected in parallel with the first light source to extinguish the first light source when the photo-responsive device is illuminated by the second light source, and an output photoresponsive device is arranged to receive illumination from one of the light sources.

For a more complete understanding of the invention reference is made to the following description and the accompanying drawings which are briefly described as follows.

Figure 1:
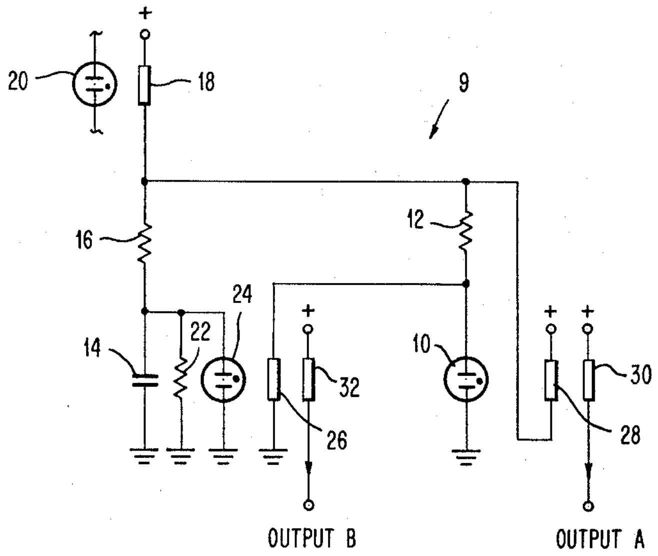
FIGURE 1 is a schematic circuit diagram of a preferred embodiment of the present invention which is capable of operation as a pulse shaper or "single shot."
Figure 6:
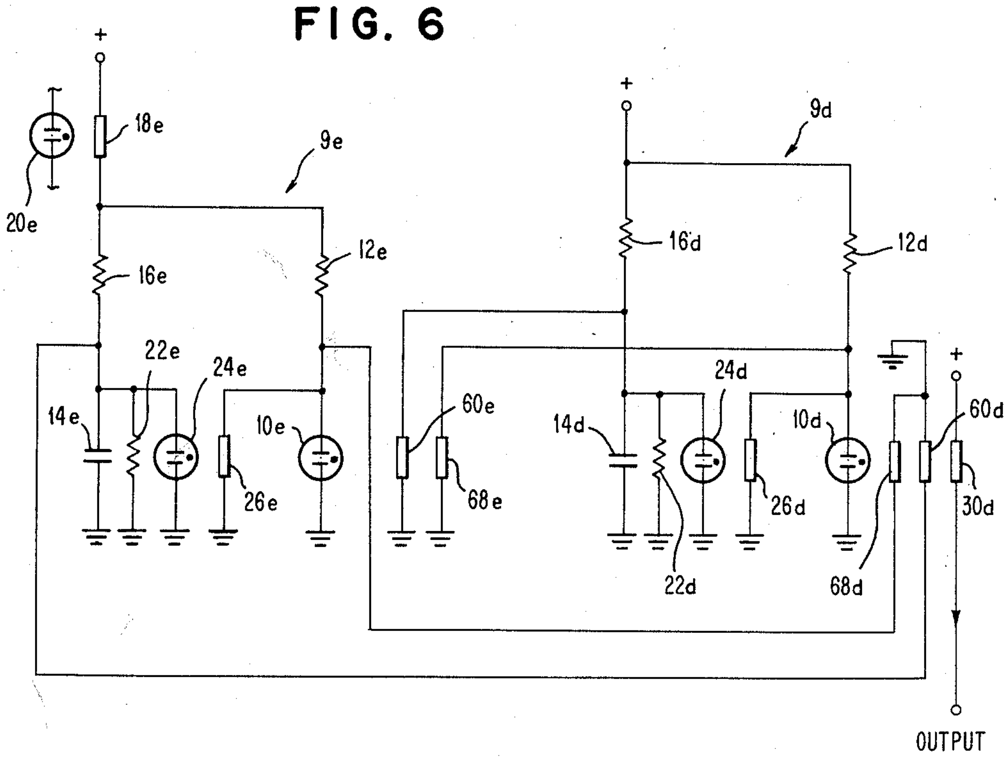

And FIGURE 6 is an alternative embodiment incorporating two two-state circuits, each of which is similar to the circuit of FIGURE 1 and which is capable of providing a symmetrical square wave output in response to a continuous input signal.

Referring more particularly to FIGURE 1 there is shown a two-state circuit indicated as a whole at 9 and including a first voltage responsive light source 10 which is connected for energization through a resistive circuit path including a resistor 12. Provided also is a capacitor 14 which is connected to be charged through a circuit including the resistor 16. The circuits including the resistors 12 and 16 are connected in parallel for energization through a circuit including a photoconductor 18 whenever that photoconductor is illuminated by a lamp 20. Capacitor 14 is normally maintained in a substantially discharged condition by a shunt resistor 22. A second voltage responsive light source 24 is connected in parallel with capacitor 14 and is operable to be illuminated as soon as the capacitor is charged to a sufficient voltage. A photoconductor 26 is arranged to receive illumination from light source 24 and is electrically connected in shunt with the first light source 10. Photoconductor 26 is thus operable to extinguish light source 10 when illuminated by light source 24. A "latching" or "holding" photoconductor 28 is arranged to receive illumination from light source 10 for the purpose of continuing the supply of energizing power to the two circuits including resistors 12 and 16, even though the input signal provided at photoconductor 18 is of short duration. Output photoconductors 30 and 32 are provided as shown to receive illumination respectively from light sources 10 and 24 to provide output signals identified as "output A" and "output B."

The operation of the circuit of FIGURE 1 is as follows: Whenever lamp 20 is illuminated, the photoconductor 18 achieves a low impedance state which thus supplies an input signal to the circuits including resistors 12 and 16. Lamp 10 is thus substantially immediately illuminated which causes holding photoconductor 28 to achieve a low impedance state to maintain an input power connection to the circuits including resistors 12 and 16. The input signal to photoconductor 18 may thus be of short duration.

Initially, the capacitor 14, being substantially discharged, holds the voltage down across light source 24, but after a predetermined time delay period which is determined by the resistance of resistor 16, plus the other impedances in the circuit and the capacity of capacitor 14, a sufficient voltage is achieved across the capacitor to illuminate light source 24. When light source 24 becomes illuminated, photoconductor 26 achieves a low impedance state and extinguishes the first light source 10. Thus, the period during which the light source 10 is illuminated is determined by the charging time of the capacitor 14. A precisely timed output signal thus may be attained at "output A" as a result of the timed illumination of photoconductor 30 from light source 10. An important and useful feature of this invention is the very precise timing of the optical output pulse available from lamp 10 as the result of the sharp cut-off provided by shunt photoconductor 26.

If the input supplied by lamp 20 and photoconductor 18 is of extended duration such that the input signal persists after light source 24 becomes illuminated and light source 10 is extinguished, it is apparent that there will be no further change in the operation of the circuit and light source 24 will remain on while light source 10 will remain off. Only when the input signal is terminated will the lamp 24 be extinguished, and capacitor 14 will be discharged through resistor 22 to return the circuit to its original condition. Photoconductor 32, which is illuminated by lamp 24, provides an "output B" which begins as "output A" ends and which ends at the termination of the input signal.

Figure 2:
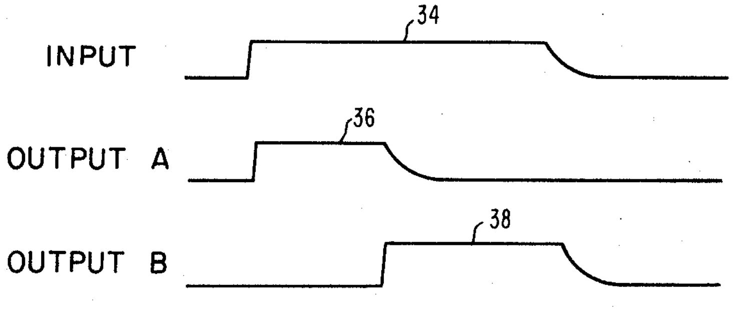
FIGURE 2 is a diagram illustrating the pulse output which is available from the circuit of FIGURE 1 in response to a prolonged pulse input.

FIGURE 2 illustrates this mode of operation of the circuit of FIGURE 1, with the prolonged input signal. Curve 34 illustrates the prolonged input signal applied through photoconductor 18. Curve 36 illustrates the "output A," having a fixed period of duration determined by the charge time of capacitor 14 and independent of the duration of the input signal. And curve 38 illustrates "output B" which has a duration which may be generally described as equal to the difference in duration between the input signal and the timed "output A."

Figure 3:
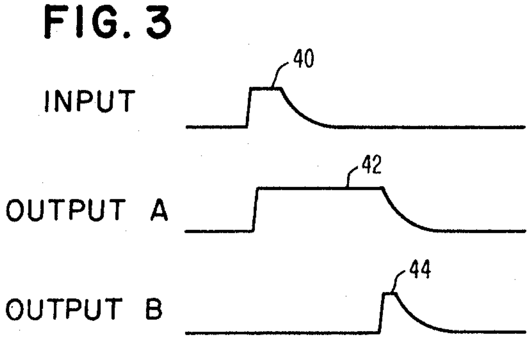
FIGURE 3 is a diagram illustrating the pulse output which is available from the circuit of FIGURE 1 in response to a short pulse input.

FIGURE 3 illustrates that if the input signal is of short duration, the output A is unchanged in duration. In FIGURE 3 the curves 40, 42, and 44 generally correspond to curves 34, 36 and 38 of FIGURE 2. As previously explained, even if the input signal from photoconductor 18 is of short duration, provided it is long enough to illuminate lamp 10, and to cause the photoconductor 28 to achieve a low impedance condition, then power is "latched" to the circuit through photoconductor 28 and the circuit continues to operate substantially as before as long as the light source 10 is illuminated. The photoconductor 28 continues the supply of power to lamp 10 and the charging current to capacitor 14. However, when capacitor 14 is charged sufficiently to cause illumination of light source 24 so as to cause photoconductor 26 to turn off light source 10, then the photoconductor 28 again becomes resistive and the capacitor 14 begins to discharge so that the circuit can resume its initial condition. Thus, as shown in FIG. 3, even with a short input as shown by curve 40, the "output A" shown by curve 42 is substantially the same in duration as the "output A" shown by curve 36 in FIGURE 2. However, the "output B" shown by curve 44 is of negligible duration since the delayed light source 24 remains on only long enough to turn off light source 10 and "drop out" the latching photoconductor 28. It will be appreciated that there is actually some delay in the shutting off of light source 24, particularly if a neon glow lamp is employed because the "firing" voltage of the lamp is substantially higher than the voltage required to maintain illumination after the lamp is fired. Accordingly, the capacitor 14, having charged up to the neon firing voltage, must be discharged to below the maintaining voltage before the lamp will be extinguished.

Throughout the drawings, the small rectangular symbols such as are used for photoconductors 18 and 26 through 32 signify devices which have photo-responsive properties which are commonly referred to as photoconductors. Since they are devices which have a lowered impedance when they are illuminated, they are more accurately described as photo-responsive impedance devices, but the popular "photoconductor" term is used in this specification. The preferred photoconductor devices will be described more fully below. Throughout the drawing the convention is followed that each photoconductor device is arranged to be illuminated only by the first light source positioned to the left of that photoconductor in the drawing. Thus, photoconductors 26 and 32 are illuminated only by lamp 24, and not by lamp 10.

Figure 4:
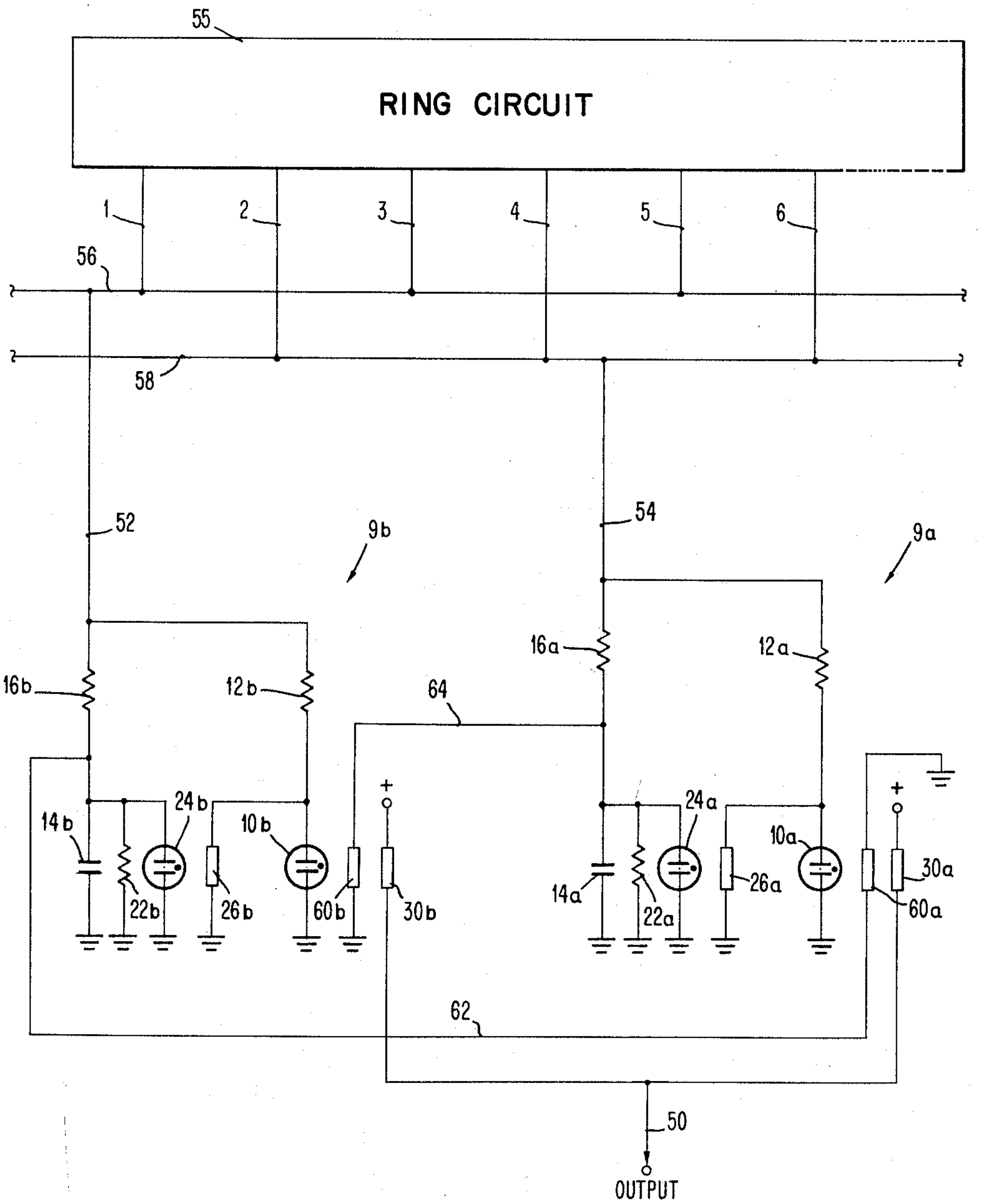
FIGURE 4 illustrates a modification of the invention which incorporates two two-state circuits, each of which is similar to the circuit of FIGURE 1 and which is capable of providing precisely timed output pulses in response to each of a succession of input pulses available alternately upon two input connections.

The embodiment of FIGURE 4 relates to a two-state system employing a pair of two-state circuits corresponding generally to the two-state circuit of FIGURE 1. The two-state circuits are lettered the same as corresponding parts of the two-state circuit of FIGURE 1, but with the suffix "*a*" for one two-state circuit and with the suffix "*b*" for the other two-state circuit.

The output photoconductors 30*a* and 30*b* have been tied together in a common output circuit indicated 50 so that whenever either of the lamps 10*a* or 10*b* is illuminated, an output will appear at 50. This system operates to provide such an output in response to inputs which appear alternately at the input connections to the respective two-state circuits at 52 and 54.

These alternate input signals may be derived from various different sources, but one typical source is a ring circuit indicated schematically at 55 and having a series of output connections numbered 1 through 6 upon which signal pulses appear in the sequence indicated by the number. The oututs 1 through 6 from the ring are converted to an alternating sequence for the two-state circuit inputs at 52 and 54 by energization of common busses 56 and 58 which feed the ring signals to the two-state circuits 9*b* and 9*a*.

As each of the two-state circuits comes on, it provides a capacitor discharge circuit path for the capacitor of the other two-state circuit. Thus, with the lamp 10*a* there is provided a photoconductor 60*a* which is connected by a cross connection indicated at 62 in shunt with capacitor 14*b* to provide for a rapid discharge of capacitor 14*b* during the timed pulse period when lamp 10*a* is illuminated. The rapid discharge of the capacitor 14*b* over a timed period assures that the succeeding timing period during which lamp 10*b* is illuminated will be of consistent duration since it determines the initial charge condition of capacitor 14*b* in a consistent manner. A similar photoconductor shunt circuit is provided by a photoconductor 60*b* which is arranged for illumination by lamp 10*b* and connected by a cross connection indicated at 64 across capacitor 14*a* for the same purpose. Thus it is to be seen that the first lamp of each two-state circuit not only provides a precisely timed output pulse at output 50, but it also provides a "reset" action by providing a capacitor discharge circuit for the other two-state circuit. Accordingly, each time the ring circuit 55 is advanced, a precisely timed output pulse of constant duration and amplitude is provided at output connection 50. This output signal can be employed within a larger system for signaling that the ring has been advanced. While the output photoconductors 30*a* and 30*b* have been indicated as supplying a voltage above ground, it is quite apparent that these photoconductors could be connected to supply ground potential whenever the system requires such an output connection.

Figure 5:
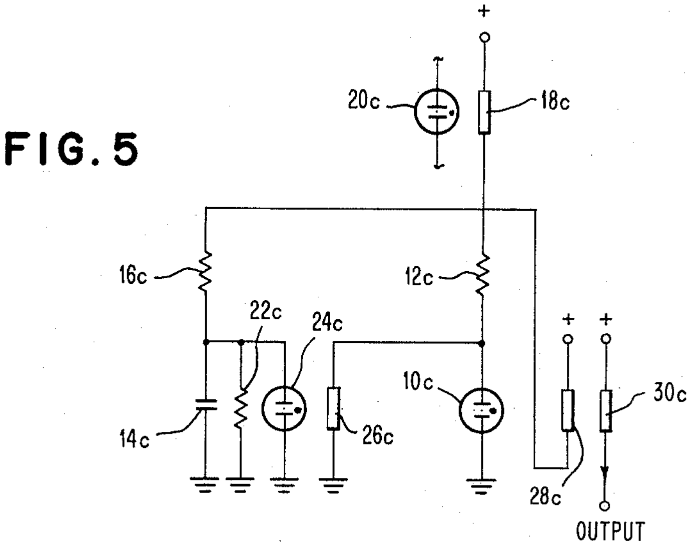
FIGURE 5 is a modification of the embodiment of FIGURE 1 which is operable to provide a series of output pulses in response to a single prolonged input signal.

FIGURE 5 shows a modification of FIGURE 1 in which corresponding parts are similarly lettered except with the suffix "*c*." In FIGURE 5 there is a change from FIGURE 1 in the connections of the circuits including resistors 12*c* and 16*c*. Instead of being connected in parallel, the input circuit represented by photoconductor 18*c* is independently connected only to the circuit including resistor 12*c* to energize lamp 10*c*, while the circuit provided by "latch" photoconductor 28*c* is connected only to the capacitor circuit including resistor 16*c*. With this arrangement of connections, the output provided from photoconductor 30*c* is a series of timed pulses which continue as long as the input signal on photoconductor 18*c* persists.

The mode of operation of FIGURE 5 to produce this result is as follows: When an input is provided by photoconductor 18*c* in response to illumination by lamp 20*c*, the lamp 10*c* is illuminated. The resultant illumination of photoconductor 28*c* provides power to capacitor 14*c*, and after the charge period, lamp 24*c* is illuminated. The resultant illumination of photoconductor 26*c* provides a shunt circuit path around lamp 10*c*, to extinguish that lamp and thus remove power from capacitor 14*c* which is supplied through photoconductor 28*c*. The capacitor 14*c* thus discharges, and as soon as the capacitor voltage decreases to a value below the maintaining voltage for lamp 24*c*, that lamp is extinguished, removing the shunt circuit on lamp 10*c* which is provided by photoconductor 26*c*. If the input signal through photoconductor 18*c* persists, the cycle is then repeated. And as long as the input signal persists, the cycle is repeated over and over again to provide a succession of output pulses from the circuit of photoconductor 30*c*. This circuit is useful whenever a succession of timed pulses is required, such as for clocking purposes. The duration of each pulse may be determined by appropriate selection of the value of the capacitor 14*c* and the resistor 16*c* to thus determine the RC constant of the charging circuit including the photoconductor 28*c*. The presence of the shunt resistor 22*c* must also be considered in this determination. The "off" period in the succession of pulses is primarily determined by the value of the shunt resistor 22*c* because this resistor determines the period for capacitor 14*c* to discharge to a voltage below the maintaining voltage of neon 24*c*. It is apparent, of course, that the other connected circuit components will also influence this. The current taken by the neon 24*c* itself will provide a major capacitor discharge effect. Since this embodiment of the invention provides a succession of pulses in response to a single prolonged input, it may be described as an oscillator or a multivibrator, or as a repetitive pulse generator.

FIGURE 6 shows another oscillator or multivibrator embodiment of the invention which employs a pair of two-state circuits 9*d* and 9*e* and which resembles the embodiment of FIGURE 4. The two-state circuits are lettered similarly to the previous embodiment with corresponding components bearing like numbers but with the suffixes "*d*" and "*e*." This embodiment is substantially similar to that of FIG. 4 except that both two-state circuits are intended to have the input energy applied continuously when the system is to be in operation, and an additional photoconductor shunt circuit is associated with each of the "10" lamps. Thus, positioned and arranged to receive illumination from lamp 10*d* there is a photoconductor 68*d* which is connected in shunt with lamp 10*e* to maintain lamp 10*e* extinguished whenever lamp 10*d* is illuminated. A similar photoconductor 68*e* is arranged to receive illumination from lamp 10*e* to maintain 10*d* in the "off" condition. An output is taken only from one output photoconductor 30*d* at lamp 10*d*, but outputs from other lamps can be taken if different output phase relationships are required.

In operation, the 9*d* two-state circuit is normally energized, and lamp 24*d* is normally on, shunting out lamp 10*d* through photoconductor 26*d*. When it is desired to operate the system to obtain an output a continuous input is applied to two-state circuit 9*e* through photoconductor 18*e* by illumination of lamp 20*e*. It will be appreciated from the previous descriptions that lamp 10*e* will be immediately illuminated for a timed period determined by the charging time of capacitor 14*e*. While lamp 10*e* is on, photoconductors 60*e* and 68*e* respectively shunt out lamps 24*d* and 10*d*, and photoconductor 60*e* forms a discharge path for capacitor 14*d*. As soon as capacitor 14*e* achieves a sufficient charge to illuminate lamp 24*e*, the resultant illumination on photoconductor 26*e* shunts out lamp 10*e* to remove the shunt connections provided by photoconductors 60*e* and 68*e*. Accordingly, the 9*d* circuit is available to operate again, and lamp 10*d* is immediately illuminated. The lighting of 10*d* provides shunt circuits across lamps 24*e* and 10*e* through photoconductors 60*d* and 68*d* so that capacitor 14*e* discharges while capacitor 14*d* charges. As soon as capacitor 14*d* charges to a sufficient level, lamp 24*d* is illuminated, shunting out lamp 10*d* through photoconductor 26*d*, and then the cycle is repeated. If the circuit constants determining the charging rate in both two-state circuits 9*d* and 9*e* are substantially identical, the periods of alternation between these two-state circuits will be approximately equal. Therefore the output available for photoconductor 30*d* is such as may be described as a square wave, since the on and off periods of the cycle are of equal duration. It is apparent of course that components providing different circuit constants may be used in the two-state circuits 9*d* and 9*e* in order to obtain any desired ratio between the "on" time and the "off" time in the output pulses from the system.

Although the photo-responsive devices such as 18 and 26 in FIGURE 1 are described in this specification as "photoconductors," it should be emphasized that devices of this description as employed in the present invention are really more accurately described as impedances which achieve a substantially reduced impedance value when they are illuminated. Thus it is contemplated that the impedance of one of these devices may be at least in the order of 200 megohms when not illuminated. But, when it is subjected to illumination, its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance having photo-responsive properties. However, the term "photoconductor" and the like is used in this specification, keeping these qualifications in mind. In the description of the circuits, for convenience, circuit paths are often described as "completed" by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New York City, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available, for instance, from the General Electric Company under Model No. NE-2. Such a device may require about 70 volts to initiate glow conduction when new, but after appreciable aging has occurred the firing voltage may advance to the order of 115 volts. After the lamp has become illuminated, a negative resistance effect is to be observed such that the voltage across the glow lamp may drop to about 55 volts. As the lamp ages, this voltage also rises to a maximum value in the order of 100 volts. The current required for such a neon lamp may vary from one quarter of a milliampere to one milliampere.

It will be appreciated that various other voltage responsive light source devices may be employed and that other photoresponsive devices may be used to detect the illumination from such devices. For instance, the voltage responsive light sources may be electroluminescent devices, or incandescent filament devices, or devices employing gaseous discharges to derive illumination from fluorescent coatings. In each instance photoconductive devices are selected which are particularly responsive to the spectrum of light emitted by the light source employed. Fortunately, the neon lamps mentioned above and the photoconductive devices mentioned above work well together. Accordingly, the neons are preferred and the light sources in the present specification are all indicated as being neon light sources, but it will be understood that other sources may be employed if desired.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

With neon glow lamps, it is generally necessary that some series impedance be employed, as well as some shunt impedance. The value of each of the shunt impedances is preferably about one megohm. This one megohm shunt across each neon serves to set a maximum impedance for the neon with respect to the remainder of the circuit. Although impedance values for the various circuit components are not specified, it will be understood that whenever operation is required to provide output illumination, the series impedances for the various neons generally will be so chosen as to result in a neon current in the order of one milliampere.

In order to simplify the drawings and make them clearer and more easily understood, some of the lamp shunt impedances are omitted from the drawings, but it will be understood that such impedances are to be employed in the practical embodiments of the invention.

Also, to further simplify the drawings, the power supply connections are not wired in, either at the common ground connection or at the high voltage connections. The common ground connections are indicated conventially by the ground symbol, and the high voltage connections are indicated by a terminal symbol with a + sign. The value of the supply voltage may be selected to conform to the impedance values and the current requirements of the circuit design. A good workable value of supply voltage has been found to be about 300 volts. When employing neon lamps as the light sources, it has been found desirable to employ a direct current power supply source, or an alternating current power supply at a frequency of about 1000 cycles. With other light sources, other voltages and frequencies may be employed. Conventional sources of power may be employed to obtain satisfactory operation of the systems of the present invention.

While the invention has been particularly shown and described with reference to preferred embodiments thereof, it will be understood by those skilled in the art that various changes in form and details may be made therein without departing from the spirit and scope of the invention.

What is claimed is:

1. A photologic two-state circuit comprising a voltage source, a first voltage responsive light source responsive to said voltage source, a capacitor connected to be energized by said voltage source through a resistive circuit path concurrently with the energization of said first light source, a second voltage responsive light source connected in parallel with said capacitor for illumination when a sufficient charge voltage is achieved on said capacitor, a photoresponsive device positioned to receive illumination from said second light source and connected in parallel with said first light source, said photoresponsive device being operable when illuminated to extinguish said first light source, and an output photoresponsive device positioned to receive illumination from one of said light sources.

2. A photologic two-state timing circuit comprising a voltage source, a first neon lamp light source connected to be energized by said voltage source through a first resistive circuit path, a capacitor connected to be energized through a second resistive circuit path by said voltage source, said capacitor and said second resistive circuit path having an RC constant, said resistive circuit paths being connected in parallel for substantially concurrent energization in response to a common input signal from said voltage source, a second neon lamp light source connected in parallel with said capacitor for illumination after a time delay period determined by said RC constant when a sufficient charge voltage is achieved on said capacitor, a photoconductor positioned to receive illumination from said second neon lamp light source and connected in parallel with said first neon lamp light source, said photoconductor being operable when illuminated to extinguish said first neon lamp light source, and an output photoconductor positioned to receive illumination from one of said neon lamp light sources.

3. A photologic two-state circuit comprising a voltage supply a first voltage responsive light source responsive to said voltage supply, a resistive circuit path, a capacitor connected to be energized through said resistive circuit path concurrently with the energizations of said light source by said voltage supply a first photoresponsive device responsive to and positioned for illumination from said light source for latching said voltage supply to said light source and said resistive path, a second voltage responsive light source connected in parallel with said capacitor for illumination when a sufficient charge voltage is achieved on said capacitor, a second photoresponsive device positioned to receive illumination from said second light source and connected in parallel with said first light source, said second photoresponsive device being operable when illuminated to extinguish said first light source, and an output photoresponsive device positioned to receive illumination from one of said light sources.

4. A photologic single shot circuit comprising a voltage supply, a first voltage responsive light source responsive to said voltage supply, a resistive circuit path, a capacitor connected to be energized through said resistive circuit path, a common switching device connected between said voltage supply, said first voltage responsive light source and said capacitor, for switching voltage from said voltage supply to said resistive circuit path and to said first voltage responsive light source simultaneously, a second voltage responsive light source connected in parallel with said capacitor and operable for illumination when a sufficient charge voltage is achieved thereon, a photo-responsive device positioned to receive illumination from said second light source and connected in parallel with said first light source, said photo-responsive device being operable when illuminated to extinguish said first light source, and an output photo-responsive device positioned to receive illumination from said first light source.

5. A photologic single shot circuit comprising a voltage source, a first neon lamp, a resistive circuit path, a capacitor connected for energization through said resistive circuit path, a photoconductor input device connected between said voltage source, said capacitor, and said first neon lamp for switching electrical energy to said first neon lamp and to said resistive circuit path simultaneously, a second neon lamp connected in parallel with said capacitor, said second neon lamp being responsive to said capacitor, for illumination when said capacitor is charged to said second neon lamp firing voltage, a second photoconductor positioned to receive illumination from said second neon lamp and connected in parallel with said first neon lamp, said second photoconductor being operable when illuminated by said second neon lamp to extinguish said first neon lamp, and an output photoconductor positioned for illumination from said first neon lamp.

6. A photologic single shot circuit comprising a voltage source, a first neon lamp, a resistive circuit path, a capacitor connected for energization through said resistive circuit path, a photoconductor input device connected between said voltage source, said capacitor, and said first neon lamp for switching electrical energy to said first neon lamp and to said resistive circuit path simultaneously, a latching photoconductor positioned to receive illumination from said first neon lamp and connected in parallel with said input device to latch electrical energy to said first neon lamp and said resistive circuit path, a second neon lamp connected in parallel with said capacitor, said second neon lamp being responsive to said capacitor for illumination when said capacitor is charged to said second neon lamp firing voltage, a third photoconductor positioned to receive illumination from said second neon lamp and connected in parallel with said first neon lamp, said third photoconductor being operable when illuminated by said second neon lamp to extinguish said first neon lamp, and an output photoconductor positioned for illuminuation from said first neon lamp.

7. A photologic multivibrator circuit comprising a voltage source, a first voltage responsive light source responsive to said voltage source, a first photoconductor device positioned for illumination by said first light source, a capacitor circuit path comprising a capacitor connected to be energized by said voltage source through a resistive circuit path including said first photoconductor device when said first photoconductor device is illuminated by said first light source, a second voltage responsive light source connected in parallel with said capacitor for illumination when a sufficient charge voltage is achieved on said capacitor, a second photoconductor device positioned to receive illumination from said second light source and connected in parallel with said first light source, said second photoconductor device being operable when illuminated to extinguish said first light source and to thereby de-energize said capacitor circuit path, said capacitor circuit path including a discharge impedance connected in parallel with said capacitor for discharging said capacitor after de-energization of said circuit path and thereby extinguishing said second light source, said first light source being again operable when illumination is removed from said second photoconductor device by the extinguishment of said second light source, and an output photoconductor device responsive to illumination from said first light source for providing a series of output pulses.

8. A switching system for providing a sequence of timed pulses comprising a pair of two state circuits, each of said two state circuits including a first voltage responsive light source, a capacitor connected to be energized through a resistive circuit path concurrently with the energization of said first light source, a second voltage responsive light source connected in parallel with said capacitor for illumination when a sufficient charge voltage is achieved on said capacitor, a first photoresponsive device positioned to receive illumination from said second light source and connected in parallel with said first light source, said first photoresponsive device being operable when illuminated to extinguish said first light source, a second photo-responsive device responsive to illumination from said first light source of each two-state circuit and connected in parallel with said capacitor of the other two-state circuit to provide, when illuminated, a discharge path for said last-recited capacitor, and an output photoresponsive device responsive to illumination from one of said first light sources for providing said sequence of timed pulses.

9. A photologic switching system for providing a series of pulses of precisely timed duration in response to input signal pulses alternately received on a first and second input line, said system comprising a pair of two state circuits a first one of said two state circuits being connected to receive signals at said first input line, a second one of said two state circuits being connected to receive signals at said second input line, each two state circuit including a first voltage responsive light source connected to receive an input signal pulse from the input line connected to said two state circuit, a capacitor connected to be energized from the input line connected to said two state circuit through a resistive circuit path, a second voltage response light source connected in parallel with said capacitor for illumination when a sufficient charge voltage is achieved on said capacitor, a first photo-responsive device positioned to receive illumination from said second light source and connected in parallel with said first light source, said first photo-responsive device being operable when sufficient illumination is received from said second light source to extinguish said first light source, second and third photo-responsive devices positioned to receive illumination from said first light source, said second photo-responsive devices of both of said two state circuits being connected in parallel to provide an output signal in response to illumination of either of said first light sources, and said third photo-responsive device of each of said two-state circuits being connected in parallel with said capacitor of the other of said two-state circuits to provide when illuminated a discharge path for said capacitor.

10. A system for providing a train of substantially equal pulses in which each "pulse on" time is substantially equal to each "pulse off" time comprising a pair of two-state circuits, each of said two-state circuits comprising a first neon lamp light source connected to be energized through a first resistive circuit path and a capacitor connected to be energized through a second resistive circuit path, said capacitor and said second resistive circuit having an RC time constant said first and second resistive circuit paths being connected for concurrent energization, a second neon lamp light source connected in parallel with said capacitor for illumination after a capacitor charging time delay period determined by said RC constant when a sufficient charge voltage is achieved on said capacitor, a photoconductor positioned to receive illumination from said second neon lamp light source and connected to parallel with said first neon lamp light source and operable when illuminated to extinguish said first neon lamp light source, second and third photoconductors arranged to receive illumination from said first neon lamp light source, said second and third photoconductors of each two-state circuit being connected in shunt with the respective neon lamp light sources of the other two-state circuit, and an output circuit photoconductor positioned to receive illumination from said first neon lamp light source of one of said two-state circuits.

References Cited by the Examiner

UNITED STATES PATENTS

| | | | |
|---|---|---|---|
| 2,575,516 | 11/51 | Hagen | 328—206 |
| 2,604,589 | 7/52 | Burns | 328—206 |
| 2,727,683 | 12/55 | Allen et al. | 250—209 X |
| 2,926,264 | 2/60 | Fitzpatrick | 328—2 |
| 2,944,164 | 7/60 | Odell et al. | 307—88.5 |
| 2,997,596 | 8/61 | Vize | 250—209 |
| 3,038,080 | 6/62 | Matarese | 307—88.5 |
| 3,145,302 | 8/64 | Dunne et al. | 250—209 X |

FOREIGN PATENTS

| | | |
|---|---|---|
| 541,202 | 3/56 | Italy. |

RALPH G. NILSON, *Primary Examiner.*

JOHN W. HUCKERT, WALTER STOLWEIN, *Examiners.*

UNITED STATES PATENT OFFICE

CERTIFICATE OF CORRECTION

Patent No. 3,185,850 May 25, 196

René H. Terlet

It is hereby certified that error appears in the above numbered patent requiring correction and that the said Letters Patent should read as corrected below.

Column 4, line 22, for "oututs" read -- outputs --; column 5, line 36, for "embodiment" read -- embodiments --; column 9, line 14, for "illuminuation" read -- illumination --; column 10, line 20, for "of", first occurrence, read -- from --; line 41, for "to" read -- in --.

Signed and sealed this 21st day of December 1965.

(SEAL)
Attest:

ERNEST W. SWIDER
Attesting Officer

EDWARD J. BRENNER
Commissioner of Patents